No. 753,421. PATENTED MAR. 1, 1904.
A. L. MOWRY.
LOCK NUT.
APPLICATION FILED AUG. 24, 1903.
NO MODEL.
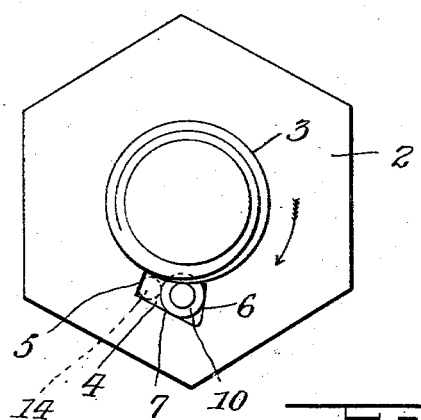
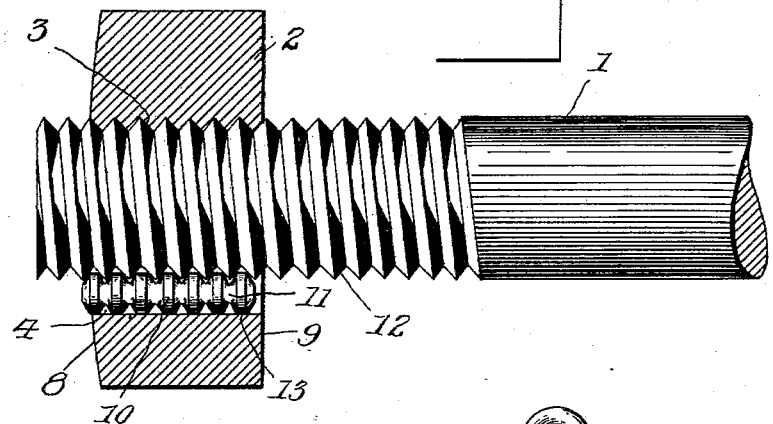
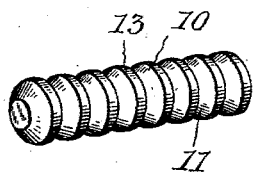
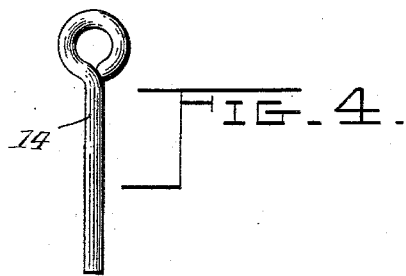
Witnesses:
Albert L. Mowry, Inventor
By Marion & Marion
Attorneys No. 753,421. Patented March 1, 1904.

UNITED STATES PATENT OFFICE.

ALBERT L. MOWRY, OF ST. JOHN, CANADA.

LOCK-NUT.

SPECIFICATION forming part of Letters Patent No. 753,421, dated March 1, 1904.

Application filed August 24, 1903. Serial No. 170,555. (No model.)

*To all whom it may concern:*

Be it known that I, ALBERT L. MOWRY, a subject of the King of Great Britain, residing at St. John, in the county of St. John, in the Province of New Brunswick, in the Dominion of Canada, have invented certain new and useful Improvements in Lock-Nuts; and I do hereby declare that the following is a full, clear, and exact description of the invention, such as will enable others skilled in the art to which it appertains to make and use the same.

My invention relates to lock-nuts, and my object is to provide a simple device of this kind which will be inexpensive and readily applied and which will be very efficient in preventing the removal of a nut from its bolt.

The arrangement consists, substantially, in providing the bore of the nut with a recess cut into the wall thereof. This recess preferably extends continuously between the outer and inner faces of the nut and is adapted to receive a locking-key. This key is adapted to engage between the threads of the bolt, so that it may not be removed simply by longitudinal movement, and it is adapted also to rest against the outer face of the recess. The distance between this outer face and the shank of the bolt diminishes in one direction, whereby when the nut is turned in a direction to remove the same this key will jam itself between the side of the shank and the said outer face of the recess, thereby preventing further movement of the nut. When the key occupies the enlarged portion of the recess, however, the nut may be turned, and for the purpose of unlocking the nut I provide a small pin, which is adapted to be inserted in the recess in such a manner as to force the key into the enlarged portion, so as to free the nut.

The invention consists in the construction and combination of parts to be more fully described hereinafter and definitely set forth in the claims.

In the drawings, which fully illustrate my invention, Figure 1 is a plan of a bolt and nut embodying my invention. Fig. 2 represents a portion of the bolt in side elevation, representing the nut in section as applied to the same. Fig. 3 is a perspective of the locking-key. Fig. 4 is a side elevation of the releasing-pin.

Throughout the drawings and specification the same numerals of reference denote like parts.

Referring more particularly to the parts, 1 represents a bolt having a threaded shank upon which is mounted a hexagonal nut 2, having the usual threaded bore 3 for this purpose. Before applying the nut to the bolt I provide in the wall of the bore 3 a recess 4 of preferably the form shown, comprising two substantially radial faces 5 and 6 and a face 7, which last face is so disposed as to approach the periphery of the shank of the bolt in one direction. Preferably this face 7 is substantially perpendicular to the face 5, as shown. This recess 4 extends, preferably, continuously between the outer and inner faces of the nut, (indicated, respectively, by the numerals 8 and 9.) Within this recess 4 there is received a locking-key 10, the same consisting of an elongated member of substantially the form shown in Fig. 3. This member is preferably formed by turning or cutting a plurality of peripheral grooves 11 in the lateral surface of a "round iron" member. These grooves are preferably substantially V-shaped, as shown, and are disposed at an equal distance apart, in this respect corresponding with the pitch of the threads 12 of the bolt. The notches, however, are not placed so that their edges intersect, but are disposed slightly apart, so as to produce a plurality of collars, round or cylindrical faces 13, which faces are adapted to rest upon the aforesaid outer face 7 of the recess 4. The key 10 having been inserted into the recess in the manner suggested, it would be disposed in such a manner that its notches 11 would substantially aline with the consecutive threads of the bore 3, whereupon the nut would then be applied to the bolt, the threads 12 of the bolt passing into the aforesaid grooves 11 and receiving the faces 13 therebetween, as will be readily understood. It should be understood that the diameter of the locking-key 10 is such that when the same occupies the enlarged portion of the recess 4 and lies adjacent to the face 6 of the said portion the locking-key permits perfect freedom of movement of the nut upon the bolt. Consequently if the nut (which is represented as applied to a bolt having a right-handed thread) were turned in the direction of the arrow indicated at Fig. 1 the locking-key would naturally recede toward the enlarged portion of the recess, and hence there would be no tendency to lock or bind the nut. If, however, the direction of rotation were reversed, there would be a tendency for the locking-key 10 to move toward the contracted portion of the recess, and it should be understood that the diameter of the locking-key would be such with respect to the recess as to prevent a movement of the locking-key into its contracted portion, and hence when the nut is turned in a direction to remove the same the locking-key, which tends to roll toward the contracted portion of the recess, jams itself between the face 7 and the threads 12 of the bolt and effectually prevents any further movement of the nut in this direction. When it is desired to release the nut, this may be effected by means of a small releasing-pin 14, which may be formed of bent wire. The operation of releasing the nut consists in simply inserting the extremity of the pin 14 in the contracted portion of the recess in such a manner as to force the locking-key to one side. While a pin, such as the pin 14, may be used, freqently a match or a similar object will serve the same purpose, being employed in the same manner.

The extreme simplicity of the construction is considered very advantageous, as there is but one additional piece required, and the arrangement is such as to prevent any liability of the parts becoming inoperative or out of order.

While I have shown in the accompanying drawings the preferred form of my invention, it will be understood that I do not limit myself to the precise form shown, for many of the details may changed in form or position without affecting the operativeness or utility of my invention, and I therefore reserve the right to make all such modifications as are included within the scope of the following claims or of mechanical equivalents to the structures set forth.

Having described my invention, what I claim, and desire to secure by Letters Patent, is—

1. In combination, a bolt, a nut mounted upon the threaded shank thereof, said nut having a recess formed in the bore of the same, extending between the inner and outer faces thereof, said recess having a substantially plane outer face, whereby said recess comprises an enlarged portion and a contracted portion, a locking-key consisting of an elongated cylindrical member adapted to be received by said recess and having a plurality of peripheral grooves formed therein, said grooves being adapted to receive the threads of said bolt, there being faces between said grooves adapted to roll on said outer face of said recess, whereby said locking-key may jam in the contracted portion of said recess.

2. In combination, a bolt having a threaded shank, a nut mounted thereupon, said nut having a recess in the bore thereof, said recess having substantially radial side faces, and a substantially plane outer face, said outer face approaching said shank at one extremity whereby said recess comprises an enlarged portion and a contracted portion, and a locking-key consisting of an elongated round member having a plurality of substantially V-shaped grooves in the lateral surface thereof, said grooves being adapted to receive the threads of said bolt, there being faces between said grooves adapted to roll upon said outer face of said recess, whereby said locking-key may jam in the contracted portion thereof.

In witness whereof I have hereunto set my hand in the presence of two witnesses.

ALBERT L. MOWRY.

Witnesses:
STEPHEN B. BERCTEN,
M. PENERY FRENCH.